United States Patent [19]
Wanger

[11] Patent Number: 5,800,068
[45] Date of Patent: Sep. 1, 1998

[54] SPINDLE FOR GAS BEARING OF A RAPIDLY ROTATING TOOL

[76] Inventor: Gerhard Wanger, Grosslellenfeld 364, D-91722 Arberg, Germany

[21] Appl. No.: 931,794

[22] Filed: Sep. 16, 1997

[30] Foreign Application Priority Data

Sep. 16, 1996 [DE] Germany ............ 196 37 598.3

[51] Int. Cl.$^6$ ............................................. F16C 32/06
[52] U.S. Cl. ........................ 384/119; 384/114; 384/448; 384/907.1
[58] Field of Search ........................... 384/119, 448, 384/907.1, 913, 109, 118, 114

[56] References Cited

U.S. PATENT DOCUMENTS

| | | | |
|---|---|---|---|
| 4,239,300 | 12/1980 | Adler | 384/120 |
| 4,277,113 | 7/1981 | Heshmat | 384/124 |
| 4,668,107 | 5/1987 | Showalter | 384/114 |

*Primary Examiner*—Lenard A. Footland
*Attorney, Agent, or Firm*—Steinberg & Raskin, P.C.

[57] ABSTRACT

A spindle for a gas bearing of a rapidly rotating tool, including a spindle housing, a bushing arranged in the housing, at least one ceramic bearing pressed into the bushing over substantially the entire length thereof and a rotating shaft gas-supported in the housing in the axial and radial direction by the bearings such that a gap remains between the shaft and the bearings. In order to control the narrowing of the gap formed between the shaft and the bearings, the material and thickness of the bushing and bearing are selected such that the product of elasticity module and wall thickness of the bushing is at least about 1.8 times greater than the product elasticity module and wall thickness of the bearing.

19 Claims, 1 Drawing Sheet

SPINDLE FOR GAS BEARING OF A RAPIDLY ROTATING TOOL

FIELD OF THE INVENTION

The present invention relates to a spindle for a gas bearing rapidly rotating tool, and in particular, to a spindle for a gas bearing rapidly rotating tool including a ceramic bearing and a bushing pressed into the bearing in order to reduce expansion of the bearing during use.

BACKGROUND OF THE INVENTION

In the prior art, ceramic materials have often been successfully used in applications for high-speed gas journal bearings (see, e.g., BARTZ, W. et al. Luftlagerungen (air bearings) 1993, page 22). In the art of gas bearings for rotating tools including a shaft, at high rotating speeds, considerable friction is generated which increases with the bearing load and contributes to the heating up of the shaft and bearing. Since gas bearings require very narrow bearing gaps (8 to 18 µm), the shaft and bearing should always be made of a ceramic material, and therefore possess the same heat expansion coefficients, in order to avoid excessive thermal narrowing of the bearing gap.

However, even when the bearing and shaft have the same expansion coefficient, increased narrowing of the bearing gap can be observed as the load on the bearing increases. This increased narrowing of the bearing gap may lead to a blockage or failure of the bearing arrangement. One reason for this is that the shaft always heats up more than the bearing which is able to dissipate heat better because of its larger surface. Another reason is that as the bearing gap narrows, the friction of the bearing increases further because of the narrowing itself, so that the bearing quickly reaches temperatures leading to the disappearance of the bearing gap and therefore, to a blockage of the bearing.

OBJECTS AND SUMMARY OF THE INVENTION

An object of the present invention is to form the bearing from ceramic materials (e.g., graphite) and form the shaft from steel, without having to contend with thermal problems at high rotational speeds. However, in order to prevent a narrowing of the bearing gap which leads to increased friction and to thus to make it possible to improve load conditions of the bearing, a ceramic material with a higher expansion coefficient than that of the steel shaft would have to be found. Since such ceramic materials do no exist, it was attempted to influence the thermal expansion coefficient in some other manner. This was possible by pressing the bearing into a bushing having a higher expansion coefficient. However, in order to achieve this goal with advantageous shaft materials, the pressed bushing must have at least about three times the expansion coefficient of the ceramic bearing and about 1.3 times the expansion coefficient of the material of the shaft.

Extensive tests have shown that the degree of pressing in or shrinkage does not influence the expansion coefficient at the bearing gap diameter, so that it is possible to dispense with an accurate precisely sized pressing with narrower manufacturing tolerances. Pressing should, however, be selected at such a force that separation between bearing and bushing is impossible at the maximum possible temperature.

From calculations and additional tests, it was found that the expansion coefficient at the bearing diameter can be influenced substantially by the ratio of the wall thickness between the ceramic bearing and pressed bushing. If the wall thickness of the ceramic bearing increases, the expansion coefficient of the ceramic material at the bearing gap diameter will become even greater. However, if the wall thickness of the pressed bushing increases, the expansion coefficient of the bushing will asymptotically take an ever increasing effect. Since the elastic deformation range should not be exceeded when pressing the bearing and bushing together, the elasticity module of the gas bearing and shaft material also play an important role. In addition to the conditions of the heat expansion coefficients indicated above, the conditions of wall thickness and elasticity module must now also be determined. Accordingly, it has been found that the product of elasticity module and wall thickness should be at least about 1.8 higher at the bushing than at the bearing.

Finally, all important geometric and physical magnitudes are designed so that narrowing of the gas bearing gap is prevented even at high bearing loads and even during the heating of the members defining the gap. However, a slight widening of the bearing gap may occur throughout the heating, but one which has no especially negative effects on the bearing arrangement. This is because the widening of the bearing gap reduces the friction of the gas bearing so that the heat is reduced again and a point of equilibrium is reached with a slight widening.

In certain applications, it has been proven advantageous to attach the bearings to elastic rings in spindle housings, e.g., rubber rings. It is advantageous to suspend the bearing bushing in the center in the rubber rings as in the case where several bearings are present such that they can align themselves automatically.

BRIEF DESCRIPTION OF THE DRAWING

A more complete appreciation of the present invention and many of the attendant advantages thereof will be readily understood by reference to the following detailed description when considered in connection with the accompanying drawing in which.

DETAILED DESCRIPTION OF THE PREFERRED EMBODIMENTS

Figure 1:
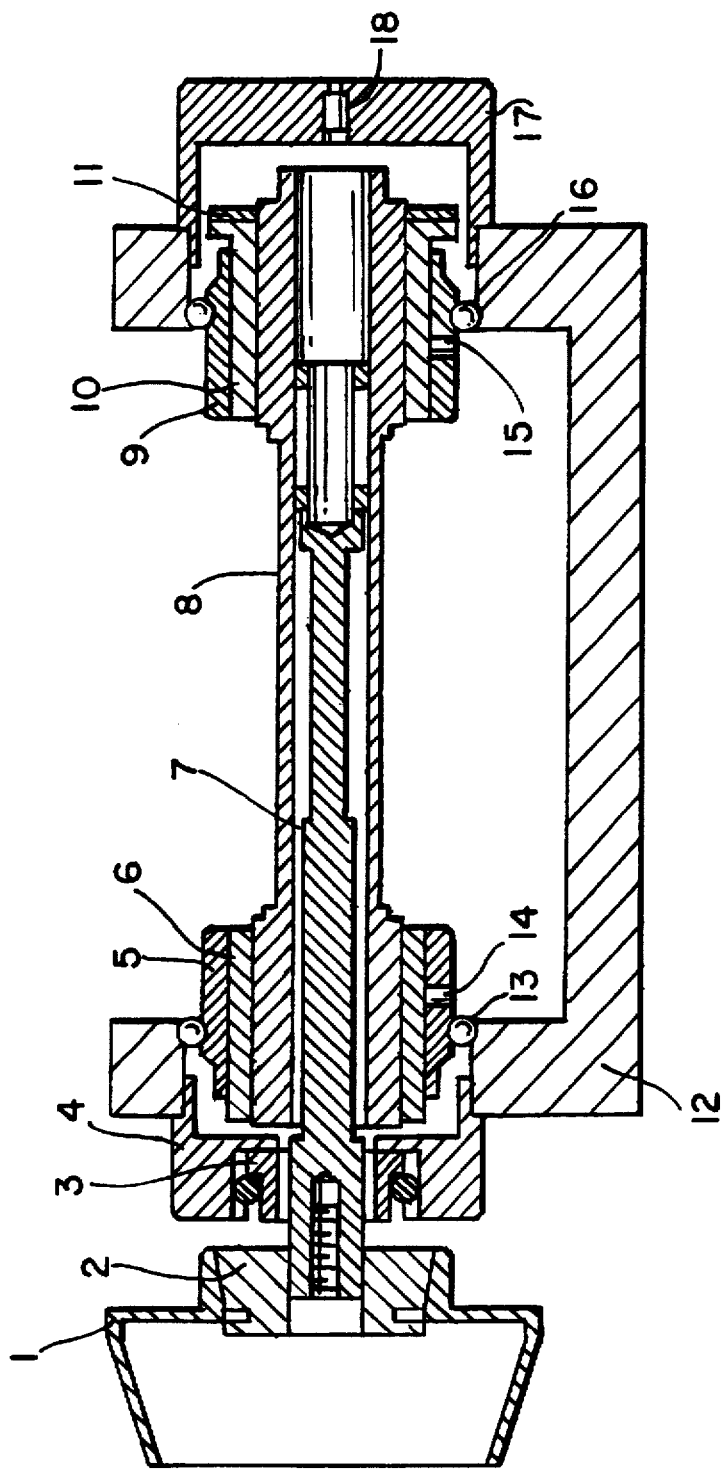
FIG. 1 shows a cross-sectional side view of a spindle for a gas bearing for an open-end spinning rotor in accordance with the invention.

Referring to the accompanying drawing, the spindle in accordance with the invention comprises a spinning rotor 1 and an elongate, freely oscillating extension 7, also referred to as an extension rod. The spinning rotor 1 is removably attached to one end of the freely oscillating extension 7 by connecting means such as a detachable connection member 2. At the same end, a tubular slide bearing 3 is arranged which limits the oscillation deflections as the first self-oscillation of the freely oscillating extension 7 takes place. A substantially cylindrical, overlying lid 4 is arranged around the slide bearing 3 and connected with a spindle housing 12, such as by being pressed therein, while the slide bearing 3 is suspended from O-rings in the lid 4.

An elongate tubular shaft 8 is aerostatically mounted in housing 12 in the radial and axial directions and is provided with a cylindrical bore into which the freely oscillating extension 7 is mounted, such as by being pressed therein. Two areostatic bearings 6, 10 are arranged around ends of the shaft 8 in such a manner that the extension's 7 thinnest portion is located between the two aerostatic bearings 6, 10, since the radial force emanating from the spinning rotor takes effect at that point. At the back of shaft 8, a disk 11 is attached by means of a press connection and serves for axial support of the shaft 8 in both directions. A radial bearing gap is produced between the shaft 8 and the bearings 6, 10, the gap being about 10 to 14 μm. The shaft 8 is preferably formed from steel.

Each of the two aerostatic bearings 6, 10 consists of a bearing body made of graphite and an over-pressed bushing 5, 9 made of aluminum, i.e., the bushing being pressed into the bearing. The pressing or shrinking distance between the bearing body and the bushing ranges from about 0.04 mm to about 0.06 mm. On each aluminum bushing 5,9, a compressed-air connection 14, 15 is provided through which the bearing gap is supplied with air via the porous graphite and a circumferential groove in the bushing. A collar is provided on the rear aerostatic bearing body and serves to support the shaft axially.

The two aerostatic bearings, 6, 10 are elastically suspended in the spindle housing 12 by O-rings 13, 16. To ensure that the O-rings 13,16 have an axial fixing, grooves are cut on the bearing and into the bore of the spindle housing. In addition, rings of synthetic material such as silicon and foamed material are suitable for elastically suspending the bearing in the spindle housing.

The rear bearing 10, together with the O-ring 16 and a closing lid 17, constitutes a pressure chamber, by means of which a pre-stressing force acts upon the aerostatic bearing so that it is able to absorb forces in both directions. The pressure is produced by a choke 18 which is located in the closing lid. The choke 18 consists of a plug with porous material.

In accordance with another embodiment of the invention, a method for preventing narrowing of a gap in a spindle for a gas bearing of a rapidly rotating tool is presented. The gap is defined between a shaft and at least one ceramic bearing and the spindle includes a spindle housing and a bushing arranged in the housing. The ceramic bearings are pressed into the bushing over substantially the entire length of the bushing and the shaft is rotatably gas-supported in the housing in the axial and radial directions by the bearings. In the method, in order to control the narrowing of the gap formed between the shaft and the bearings, the material of the bushing and the bearings are selected such that the product of elasticity module and wall thickness of the bushing is at least 1.8 times greater than the product elasticity module and wall thickness of the bearings.

Obviously, numerous modifications and variations of the present invention are possible in light of the teachings hereof. Therefore, it is to be understood that the invention can be varied from the detailed description above within the scope of the claims appended hereto.

What is claimed is:

1. Spindle for a gas bearing of a rapidly rotating tool, comprising a spindle housing, a bushing arranged in said housing, at least one ceramic bearing pressed into said bushing over substantially the entire length of said bushing, a rotating shaft gas-supported in said housing in the axial and radial directions by said at least one bearing such that a gap remains between said shaft and said at least one bearing, the tool being coupled to said shaft, and wherein the product of elasticity module of the material of said bushing and wall thickness of said bushing is at least 1.8 times greater than the product elasticity module of the material of said at least one bearing and wall thickness of said at least one bearing in order to control the narrowing of the gap formed between said shaft and said at least one bearing.

2. The spindle of claim 1, wherein said bushing and said at least one bearing are attached in the housing on elastic rings.

3. The spindle of claim 2, wherein said elastic rings are O-rings and are formed from rubber.

4. The spindle of claim 1, wherein said shaft is formed from steel.

5. The spindle of claim 4, wherein said bearing is formed from graphite and said bushing is formed from aluminum.

6. The spindle of claim 1, wherein the rapidly rotating tool is an open-end spinning rotor.

7. The spindle of claim 1, further comprising a lid pressed into said housing, at least one O-ring coupled to said lid, and a slide bearing suspended from said at least one O-ring.

8. The spindle of claim 1, wherein said shaft is aerostatically mounted in said housing.

9. The spindle of claim 1, further comprising a compressed-air connection arranged on said bushing through which the gap is supplied with air.

10. The spindle of claim 1, further comprising a disk arranged at the back of said shaft by means of a press connection which serves for axial support of said shaft in both directions.

11. The spindle of claim 1, wherein said gap ranges from about 10 μm to about 14 μm.

12. The spindle of claim 1, wherein said at least one bearing and said bushing have a pressing or shrinking distance ranging from about 0.04 mm to about 0.06 mm.

13. The spindle of claim 1, wherein said shaft has a bore, wherein said at least one ceramic bearing is two aerostatic bearings and the spindle further comprises a freely oscillating extension pressed into the bore such that a portion thereof is located between said two aerostatic bearings.

14. The spindle of claim 13, further comprising a collar arranged on one of said aerostatic bearings to support the shaft axially.

15. The spindle of claim 13, wherein said two aerostatic bearings are elastically suspended in said housing by respective O-rings.

16. The spindle of claim 15, where in grooves are cut into said bearings and the bore of said housing in order to ensure axial fixing of sad O-rings.

17. The spindle of claim 16, further comprising a closing lid and wherein one of said bearings, one of said O-rings and said closing lid constitute a pressure chamber by which a pre-stressing force acts upon said aerostatic bearing so that it is able to absorb forces in both directions.

18. The spindle of claim 17, further comprising a choke arranged in said closing lid.

19. The spindle of claim 18, wherein said choke comprises a plug having porous material.

* * * * *